Aug. 24, 1943.  A. WARMISHAM  2,327,947
OPTICAL OBJECTIVE
Filed Feb. 19, 1942
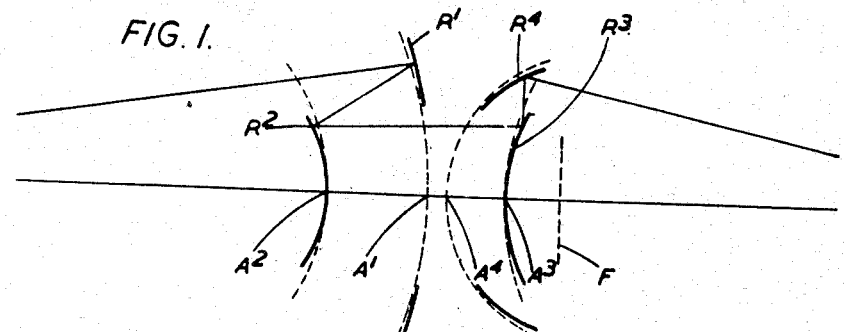
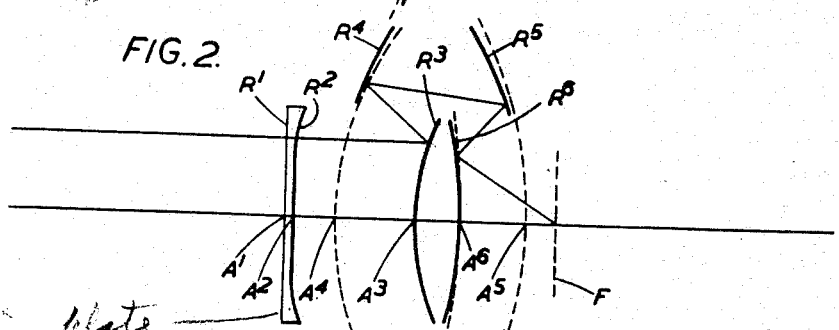
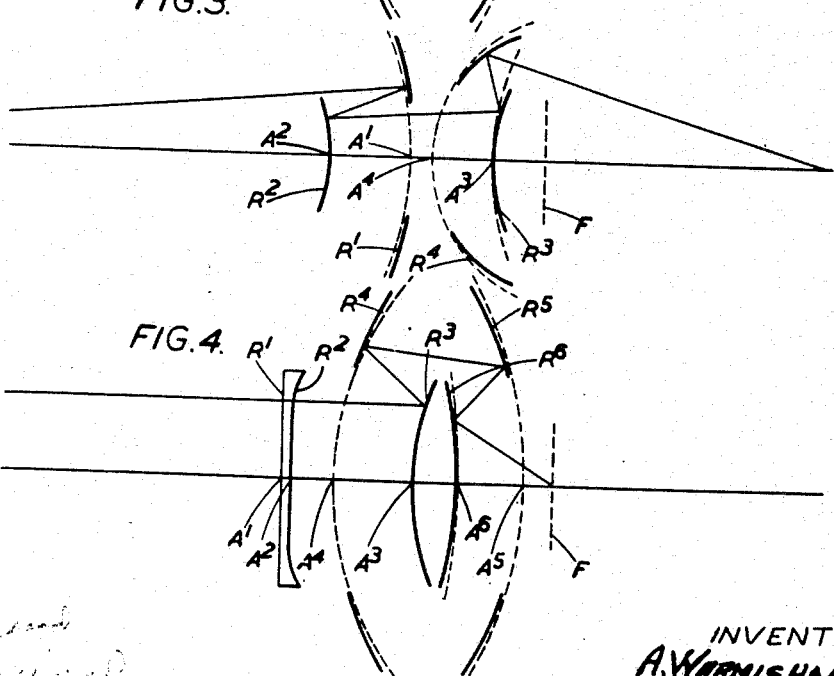
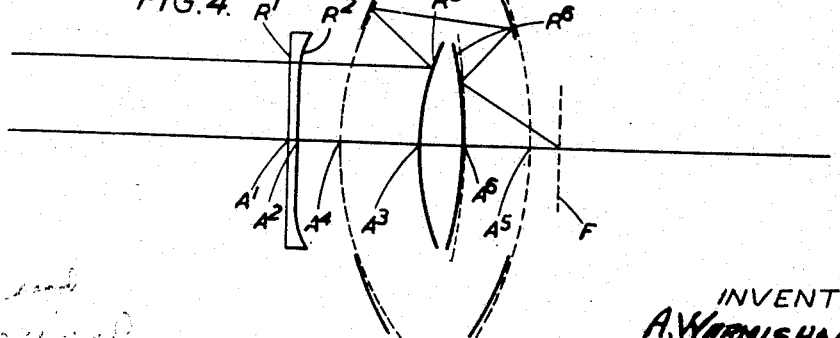
INVENTOR
A. WARMISHAM
BY
ATTORNEY Patented Aug. 24, 1943

2,327,947

UNITED STATES PATENT OFFICE 2,327,947

OPTICAL OBJECTIVE

Arthur Warmisham, Leicester, England, assignor to Taylor, Taylor & Hobson Limited, Leicester, England, a company of Great Britain Application February 19, 1942, Serial No. 431,580
In Great Britain February 20, 1941

19 Claims. (Cl. 88—57)

This invention relates to optical objectives for photographic or projection or other purposes. Such objectives (except in certain special instances more especially in reflecting telescopes) have hitherto usually been constituted by a system of refracting lenses, and serious difficulties have consequently arisen in achieving any refined correction of chromatic aberration.

The present applicant's United States of America patent applications Serial Nos. 394,709, 392,967 and 426,911, relate to optical systems in which chromatic aberration difficulties are obviated by the employment of curved reflecting surfaces to supply the optical power, whilst at the same time means are provided for affording correction for some or all of the other aberrations. In particular application Serial No. 392,967 relates to the use of at least one spheroidal surface located at the axial centre of curvature of one or more curved reflecting surfaces and so shaped as to afford correction for the spherical aberration, coma and astigmatism thereof.

The present invention has for its primary object to provide a further alternative arrangement for the same general purpose, wherein use is again made of spheroidal surfaces for affording correction for the aberrations of the objective, but without limitation to the location of such surfaces at the axial centres of curvature of other surfaces.

This object may be achieved according to the invention by employing in the objective three or more curved surfaces of which at least two are reflecting surfaces of substantial curvature supplying the optical power of the objective and of which at least three are spheroidal surfaces each consisting of a surface of revolution generated by rotation about the $x$-axis of a curve of the form of $$x = \tfrac{1}{2}\frac{y^2}{r_0} + Ay^4 \ldots$$

higher powers of $y$, wherein $r_0$ (which may have any desired value, finite or infinite) is the radius of the osculating sphere at the vertex, the vertex curvatures and the axial separations of the curved reflecting surfaces being so interrelated that the objective will have a predetermined focal length and zero or other predetermined field curvature, whilst the deviations of the spheroidal surfaces from their osculating spheres (determined by the coefficients A . . . ) are chosen substantially to balance out at least three of the four aberrations coma, spherical aberration, astigmatism and distortion of the objective. The first order aberrations can be balanced out by suitable choice of the coefficient A, whilst the coefficients of the higher powers of $y$ can be chosen to correct the higher order aberrations.

In the case of objectives for certain purposes it is unnecessary to provide any high degree of correction for distortion. Again in other instances, for example in certain wide angle lens constructions for which, in order to obtain adequate depth of focus, the photographer must stop down, say, to F/32, spherical aberration is of negligible importance. In such cases, the objective may conveniently comprise three spheroidal reflecting surfaces, which supply or contribute towards the optical power of the objective and whose deviations from their osculating spheres are chosen to balance out the coma and astigmatism and either spherical aberration or distortion of the objective. It will usually be preferable to provide a fourth reflecting surface to make convenient the direction of emergence of the light and such fourth surface may be plane or spherical. In one convenient arrangement the objective has four reflecting surfaces, of which the first (counting from the side of the longer conjugate) is spheroidal, the second spherical, and the third and four spheroidal.

For correction of the four aberrations coma, astigmatism spherical aberration and distortion, the objective may have four spheroidal reflecting surfaces having finite radius of curvature at the vertex, the deviations of such surfaces from their osculating spheres being so chosen as substantially to balance out such aberrations.

Whilst the objective according to the invention may consist wholly of spheroidal reflecting surfaces having substantial curvature at the vertex, it may in some cases be convenient to replace at least one of such surfaces by a spherical reflecting surface in combination with a substantially afocal correcting surface, whose deviations from a true plane surface contribute towards the correction of the aberrations. Thus for instance, the objective may comprise a spherical reflecting surface, three spheroidal reflecting surfaces having finite radius of curvature at the vertex, and one substantially afocal correcting surface, the arrangement being such as to give correction for field curvature, spherical aberration, coma, astigmatism and distortion. The afocal correcting surface may be constituted by a reflecting surface or alternatively the light may be transmitted through such surface. In the latter case the surface may be paraxially afocal, but is preferably made afocal for a selected zone such as to reduce chromatic difference of spherical aberration to a minimum.

In some instances the objective may include in addition to the spheroidal surfaces, one or more spherical reflecting surfaces unaccompanied by afocal correcting surfaces, the aberrations of such spherical surfaces being taken into account in calculating the shapes of the spheroidal surfaces.

Whilst the reflecting surfaces of the objective will usually be separate from one another, it may sometimes be convenient for one or more pairs of such surfaces each to be constituted by internally reflecting surfaces on a single piece of glass.

In cases where the objective is required for use not only for light within the visible range but also for ultra-violet or infra-red rays, it is preferable for the reflecting surfaces to be metallic or metallised surfaces, either aluminium or silver being especially suitable for the purpose. In instances in which the objective includes a transparent member or members through which the rays are transmitted, such member or members are made of material transparent to the particular rays for which the objective is to be used. Crystalline potassium chloride is suitable for use for rays over a wide spectral range on both sides of the visible spectrum extending from 2000 Å. to 210,000 Å., and vitreous quartz is also suitable for a large part of such range from 2000 Å. to 35,000 Å. Crystalline magnesium oxide in the form known as $\beta$-MgO is suitable for a range covering the visible spectrum and the ultra violet down to 2000 Å.

In the accompanying drawing,

Figures 1 to 4 respectively illustrate by way of example four alternative convenient practical arrangements of objective according to the invention.

In the arrangement of Figure 1, the objective comprises four air-separated spheroidal reflecting surfaces, two convex and two concave, and the drawing shows in dotted line the osculating sphere at the vertex for each spheroidal surface. The incident light is first reflected at an annular concave surface $R_1$ and then at a convex surface $R_2$, whence it passes through the central opening in the surface $R_1$ to the other convex surface $R_3$, where it is reflected to the other concave surface $R_4$ (also annular in form) and thence to the image plane.

Numerical data for one example of such objective are given in the following table, in which $R_1R_2$ ... represent the axial radii of curvature of the individual surfaces, the positive sign indicating that the surface is convex towards the front (that is the side of the objective having the longer conjugate) and the negative sign that it is concave thereto, whilst $D_{12}$ ... represents the axial air separations between the vertices $A_1A_2$ ... of the individual surfaces, the negative sign for $D_{12}$ and $D_{34}$ indicating that the second and fourth surfaces are respectively in front of the first and third surfaces. The table also gives for each of the surfaces $R_1R_2$ ... the equation in Cartesian coordinates of the generating curve, by rotation of which about the $x$-axis (that is the optical axis of the objective) the surface is generated.

*Example I*

| Radius | Axial air separation |
|---|---|
| $R_1 = -2.500$ | $(x = -.20\, y^2 + .0043\, y^4 + \text{higher order terms})$ |
|  | $D_{12} = -.625$ |
| $R_2 = -1.250$ | $(x = -.40\, y^2 - .0020\, y^4 + \text{higher order terms})$ |
|  | $D_{23} = 1.125$ |
| $R_3 = +1.667$ | $(x = +.30\, y^2 + .134\, y^4 + \text{higher order terms})$ |
|  | $D_{34} = -.38$ |
| $R_4 = +.909$ | $(x = +.55\, y^2 - .118\, y^4 + \text{higher order terms})$ |

Distance of focal plane F behind $R_4 = .728$.
Equivalent focal length 1.000.

In this example the field curvature is slightly over-corrected by a normal amount for an objective having a moderate angular field, and the first order spherical aberration, coma, astigmatism and distortion are all well corrected. This example is especially suitable as a copying objective having unity or other small magnification or reduction ratio. Although the focal plane F is marked on the drawing the example is not suitable for imaging a distant object in such focal plane since the surface $R_3$ would obstruct the convergent pencil of rays reflected from the surface $R_4$ to the focal plane.

The arrangement of Figure 2 is not subject to this difficulty and can be employed as a photographic objective or as a copying objective. In this arrangement the objective comprises three spheroidal reflecting surfaces, one spherical reflecting surface and one transparent afocal correcting plate. The incident light first passes through the correcting plate whose front surface $R_1$ is flat whilst the rear surface $R_2$ is deformed from the true plane to constitute the correcting surface, and is then reflected at the spherical surface $R_3$ which is convex. Thence the light is reflected in turn at two annular concave spheroidal surfaces $R_4R_5$ and at a convex spheroidal surface $R_6$, from which it passes to the focal plane F. The substitution of a spherical reflecting surface and an afocal correcting surface for one spheroidal reflecting surface in this arrangement may be said to be equivalent to removing the deformation from one surface and placing it in an arbitrarily selected position, thus giving one additional degree of freedom in the calculation in the choice of the position of the correcting surface. This additional parameter not only enables full correction to be made for the four first order aberrations, but also makes it possible to reduce considerably the amounts of the deformations and thus to facilitate manufacture.

Numerical data for one such example are given in the following table, wherein instead of the radius of curvature $R_2$ of the correcting surface the equation in Cartesian coordinates of its generating curve is given. It will be noted that the example has been calculated for a paraxially afocal correcting surface, but in practice it will usually be preferable to make the surface afocal for a selected zone such as to reduce chromatic difference of spherical aberration to a minimum. The calculations are based on the assumption of a mean refractive index 1.5 for the material of which the correcting plate is made, and the expression $D_{12}$ represents the axial thickness of the plate on this assumption.

Example II

| Radius | Thickness or air separation |
|---|---|
| $R_1 = \infty$ | $D_{12} = .05$ |
| $R_2 = x = .0629$ $y^4$+higher order terms | |
| $R_3 = +1.667$ | $D_{23} = .81$ |
| | $D_{34} = -.5$ |
| $R_4 = +2.000$ | $(x = +.25\, y^2 - .0189\, y^4 +$ higher order terms) |
| | $D_{45} = 1.2$ |
| $R_5 = -2.500$ | $(x = -.20\, y^2 - .0047\, y^4 +$ higher order terms) |
| | $D_{56} = -.4$ |
| $R_6 = -4.000$ | $(x = -.125\, y^2 - .0897\, y^4 +$ higher order terms) |

Distance of focal plane behind $R_6 = .603$
Equivalent focal length 1.000

In this example, the field curvature is slightly under-corrected, and the other four aberrations are well-corrected.

The arrangement of Figure 3, like that of Figure 1, is suitable for equal scale copying or copying at a small magnification or reduction ratio, rather than for imaging a distant object, but differs from Figure 1 in that the surface $R_2$ is spherical instead of spheroidal. The objective thus employs three spheroidal surfaces and one spherical surface, but without an afocal correcting surface. This affords one less degree of freedom in the calculations than in the arrangement of Figure 1. It is thus possible to correct exactly three of the four first order aberrations (for example spherical aberration, coma and astigmatism), the fourth (distortion) being ignored. In one example, of which numerical data are given below, the residual distortion after correction of the other three aberrations is only 10% of the distortion of the first surface, and for many purposes would be regarded as negligible. The field curvature is also well-corrected in this example.

Example III

| Radius | Axial air separation |
|---|---|
| $R_1 = -2.000$ | $(x = -.25\, y^2 + .0277\, y^4 +$ higher order terms) |
| | $D_{12} = -.5$ |
| $R_2 = -1.000$ | $D_{23} = 1.0$ |
| $R_3 = +1.667$ | $(x = +.3\, y^2 + .134\, y^4 +$ higher order terms) |
| | $D_{34} = -.38$ |
| $R_4 = +.909$ | $(x = +.55\, y^2 - .118\, y^4 +$ higher order terms) |

Distance of focal plane behind $R_4 = .728$
Equivalent focal length 1.000

It will be appreciated that the foregoing arrangements have been described by way of example only and that the invention may be carried into practice in other ways. Usually the objective will include at least two, and preferably four, curved reflecting surfaces for supplying the optical power, whilst the aberrations of the objective will be corrected by means of three, or preferably four, spheroidal surfaces, some (or all) of which may be constituted by the said reflecting surfaces whilst the others (if any) are in the form of substantially afocal correcting surfaces, which may either reflect or transmit the light.

The reflecting surfaces may in some instances (for example for monochromatic microscope work) be combined together in pairs, each consisting of two internally reflecting surfaces on a single member of glass or other transparent material. Thus the objectives of the first and third arrangements above described, may each be modified to consist of two appropriately shaped transparent members, in a manner analogous to that described in the above-mentioned United States of America Patent Applications.

When the objective according to the invention is intended for use with infra-red or ultra-violet light, its reflecting surfaces should be formed of or coated with metal, preferably aluminium, whilst any members of the objective, through which the light is transmitted should be made of quartz or other material transparent to the rays for which the objective is to be used. Figure 4 shows such a modification of the arrangement of Figure 2, and numerical data for such modification are given in the following table, wherein the corrector plate at the front of the objective is made of fused quartz instead of optical glass.

Example IV

| Radius | Thickness or air separation | Refractive index $n_D$ | Abbe $\nu$ number |
|---|---|---|---|
| $R_1 = \infty$ | $D_{12} = .05$ | 1.4585 | 67.9 |
| $R_2 x = -.0686\, y^4 +$ higher order terms | $D_{23} = .81$ | | |
| $R_3 = +1.667$ | $D_{34} = -.5$ | | |
| $R_4 = +2.000$ $(x = +.25\, y^2 - .0189\, y^4 +$ higher order terms). | $D_{45} = 1.2$ | | |
| $R_5 = -2.500$ $(x = -.20\, y^2 - .0047\, y^4 +$ higher order terms). | $D_{56} = -.4$ | | |
| $R_6 = -4.000$ $(x = -.125\, y^2 - .0897\, y^4 +$ higher order terms). | | | |

Distance of focal plane F behind $R_6 = .603$.
Equivalent focal length 1.000.

I claim:

1. An optical objective comprising at least three curved surfaces in axial alignment, of which at least two are reflecting surfaces of substantial curvature supplying the optical power of the objective and of which at least three are spheroidal surfaces each consisting of a surface of revolution generated by rotation about the $x$-axis of a curve of the form $$x = \tfrac{1}{2}\frac{y^2}{r_0} + Ay^4 + \ldots$$

higher powers of $y$ wherein $x$ and $y$ are the variable parameters of a Cartesian system of coordinates having origin at the vertex and with the $x$-axis coincident with the optical axis $r_0$ (which may have any desired value, finite or infinite) is the radius of the osculating sphere at the vertex, the vertex curvatures and the axial separations of the curved reflecting surfaces being so inter-related that the objective will have a predetermined focal length and zero or other predetermined field curvature, whilst the coefficients $A\ldots$ determining the deviations of the spheroidal surfaces from their osculating spheres are chosen substantially to balance out at least three of the four aberrations coma, spherical aberration, astigmatism and distortion of the objective.

2. An optical objective as claimed in claim 1, having three spheroidal reflecting surfaces, which supply or contribute towards the optical power of the objective and whose deviations from their osculating spheres are chosen to balance out the coma and astigmatism and either first order spherical aberration or first order distortion of the objective.

3. An optical objective comprising four curved reflecting surfaces in axial alignment, which supply the optical power of the objective, and of which the first (counting from the side of the longer conjugate) is spheroidal, the second spherical and the third and fourth spheroidal.

4. An optical objective as claimed in claim 3, in which the first and fourth reflecting surfaces are annular and concave and the second and third reflecting surfaces are convex.

5. An optical objective as claimed in claim 3, in which each spheroidal surface consists of a surface of revolution generated by rotation about the $x$-axis of a curve of the form $$x = \tfrac{1}{2}\frac{y^2}{r_0} + Ay^4 + \ldots$$

higher powers of $y$ wherein $x$ and $y$ are the variable parameters of a Cartesian system of coordinates having origin at the vertex and with the $x$-axis coincident with optical axis $r_0$ is the radius of the osculating sphere at the vertex and the coefficients $A \ldots$ are constants determining the deviation of the surface from its osculating sphere, the vertex curvatures and the axial separations of the four curved reflecting surfaces being so inter-related that the objective will have a predetermined focal length and zero or other predetermined field curvature, whilst the deviations of the three spheroidal surfaces from their osculating spheres are chosen substantially to balance out the coma and astigmatism and at least one of the first aberrations first order spherical aberration and first order distortion of the objective.

6. An optical objective comprising four spheroidal reflecting surfaces in axial alignment, which supply the optical power of the objective and whose deviations from the spheres osculating them at their vertices are chosen substantially to balance out the spherical aberration, coma, astigmatism and distortion of the objective.

7. An optical objective as claimed in claim 6, in which two of the spheroidal reflecting surfaces are annular and concave and the other two are convex.

8. An optical objective as claimed in claim 6, in which each spheroidal surface consists of a surface of revolution generated by rotation about the $x$-axis of a curve of the form $$x = \tfrac{1}{2}\frac{y^2}{r_0} + Ay^4 + \ldots$$

higher powers of $y$ wherein $x$ and $y$ are the variable parameters of a Cartesian system of coordinates having origin at the vertex and with the $x$-axis coincident with the optical axis $r_0$ is the radius of the osculating sphere at the vertex and the coefficients $A \ldots$ are constants determining the deviation of the surface from its osculating sphere, the vertex curvatures and the axial separations of the four curved reflecting surfaces being so inter-related that the objective will have a predetermined focal length and zero or other predetermined field curvature.

9. An optical objective as claimed in claim 1, in which at least one of the spheroidal surfaces is in the form of a substantially afocal correcting surface, whose deviations from a true plane surface contribute towards the correction of the aberrations, whilst at least one other surface of the objective consists of a spherical reflecting surface.

10. An optical objective comprising in axial alignment three spheroidal reflecting surfaces having finite radius of curvature at their vertices, one spherical reflecting surface, and one substantially afocal correcting surface, the objective being corrected for field curvature, spherical aberration, coma, astigmatism and distortion.

11. An optical objective as claimed in claim 10, in which two of the curved reflecting surfaces having finite radius of curvature are annular and concave and the other two are convex.

12. An optical objective as claimed in claim 10, in which the afocal correcting surface is constituted by one of the surfaces of a plate through which the light is transmitted.

13. An optical objective as claimed in claim 1, in which at least one of the spheroidal surfaces is in the form of a substantially afocal correcting surface, whose deviations from a true plane surface contribute towards the correction of the aberrations, whilst at least one other surface of the objective consists of a spherical reflecting surface, the afocal surface being constituted by one of the surfaces of a plate through which the light is transmitted.

14. An optical objective as claimed in claim 1, in which the reflecting surfaces are constituted by metallic or metallised surfaces.

15. An optical objective as claimed in claim 1, including at least one member of transparent material through which the light is transmitted, such material being transparent over a wide spectral range extending considerably beyond the limits of the visible spectrum, whilst the reflecting surfaces are constituted by metallic or metallised surfaces.

16. An optical objective as claimed in claim 10, in which the afocal correcting surface is constituted by one of the surfaces of a plate of fused quartz through which the light is transmitted, whilst the reflecting surfaces are constituted by metallic or metallised surfaces.

17. An optical objective comprising four axially aligned spheroidal reflecting surfaces and having numerical data substantially as set forth in the following table:

| Radius | Axial air separation |
| --- | --- |
| $R_1 = -2.500$ | $(x = -.20\,y^2 + .0043\,y^4 + \text{higher order terms})$ |
| | $D_{12} = -.625$ |
| $R_2 = -1.250$ | $(x = -.40\,y^2 + .0020\,y^4 + \text{higher order terms})$ |
| | $D_{23} = 1.125$ |
| $R_3 = +1.667$ | $(x = +.30\,y^2 + .134\,y^4 + \text{higher order terms})$ |
| | $D_{34} = -.38$ |
| $R_4 = +.909$ | $(x = +.55\,y^2 - .118\,y^4 + \text{higher order terms})$ |

Distance of focal plane F behind $R_4 = .728$
Equivalent focal length 1.000 wherein $R_1$ and $R_2 \ldots$ represent the axial radii of curvature of the individual surfaces for which the equations of the generating curves are given in Cartesian coordinates $x$, $y$, and $D_{12} \ldots$ represent the axial air separations between the vertices of the individual surfaces.

18. An optical objective comprising four axially aligned curved reflecting surfaces of which three are spheroidal and one spherical and having numerical data as set forth in the following table:

| Radius | Axial air separation |
| --- | --- |
| $R_1 = -2.000$ | $(x = -.25\,y^2 + .0277\,y^4 + \text{higher order terms})$ |
| $R_2 = -1.000$ | $D_{12} = -.5$ |
| | $D_{23} = 1.0$ |
| $R_3 = +1.667$ | $(x = +.3\,y^2 + .134\,y^4 + \text{higher order terms})$ |
| | $D_{34} = -.38$ |
| $R_4 = +.909$ | $(x = +.55\,y^2 - .118\,y^4 + \text{higher order terms})$ |

Distance of focal plane behind $R_4 = .728$
Equivalent focal length 1.000 wherein $R_1$ and $R_2 \ldots$ represent the axial radii of curvature of the individual surfaces for which the equations of the generating curves are given in Cartesian coordinates $x$, $y$, and $D_{12} \ldots$ represent the axial air separations between the vertices of the individual surfaces.

19. An optical objective comprising in axial alignment three spheroidal reflecting surfaces, one spherical reflecting surface and one substantially afocal correcting surface and having numerical data substantially as set forth in the following table:

| Radius | Thickness or air separation | Refractive index $n_D$ | Abbe $\nu$ number |
|---|---|---|---|
| $R_1 = \infty$ | $D_{12} = .05$ | 1.4585 | 67.9 |
| $R_2 = x = .0686 \; y^4 + $ higher order terms | | | |
| $R_3 = +1.667$ | $D_{23} = .81$ | | |
| $R_4 = +2.000 \; (x = +.25 \; y^2 - .0189 \; y^4 + $ higher order terms) | $D_{34} = -.5$ $D_{45} = 1.2$ | | |
| $R_5 = -2.500 \; (x = -.20 \; y^2 - .0047 \; y^4 + $ higher order terms) | $D_{56} = -.4$ | | |
| $R_6 = -4.000 \; (x = -.125 \; y^2 - .0897 \; y^4 + $ higher order terms) | | | |

Distance of focal plane F behind $R_6 = .603$
Equivalent focal length 1.000 wherein $R_1$ and $R_2$ . . . represent the axial radii of curvature of the individual surfaces for which the equations of the generating curves are given in Cartesian coordinates $x$, $y$, and $D_{12}$ . . . represent the axial air separations between the vertices of the individual surfaces.

ARTHUR WARMISHAM.